E. D. SELF.
MUD GUARD FOR AUTOMOBILES OR OTHER VEHICLES.
APPLICATION FILED MAR. 6, 1915.
1,235,251.
Patented July 31, 1917.
2 SHEETS—SHEET 1.
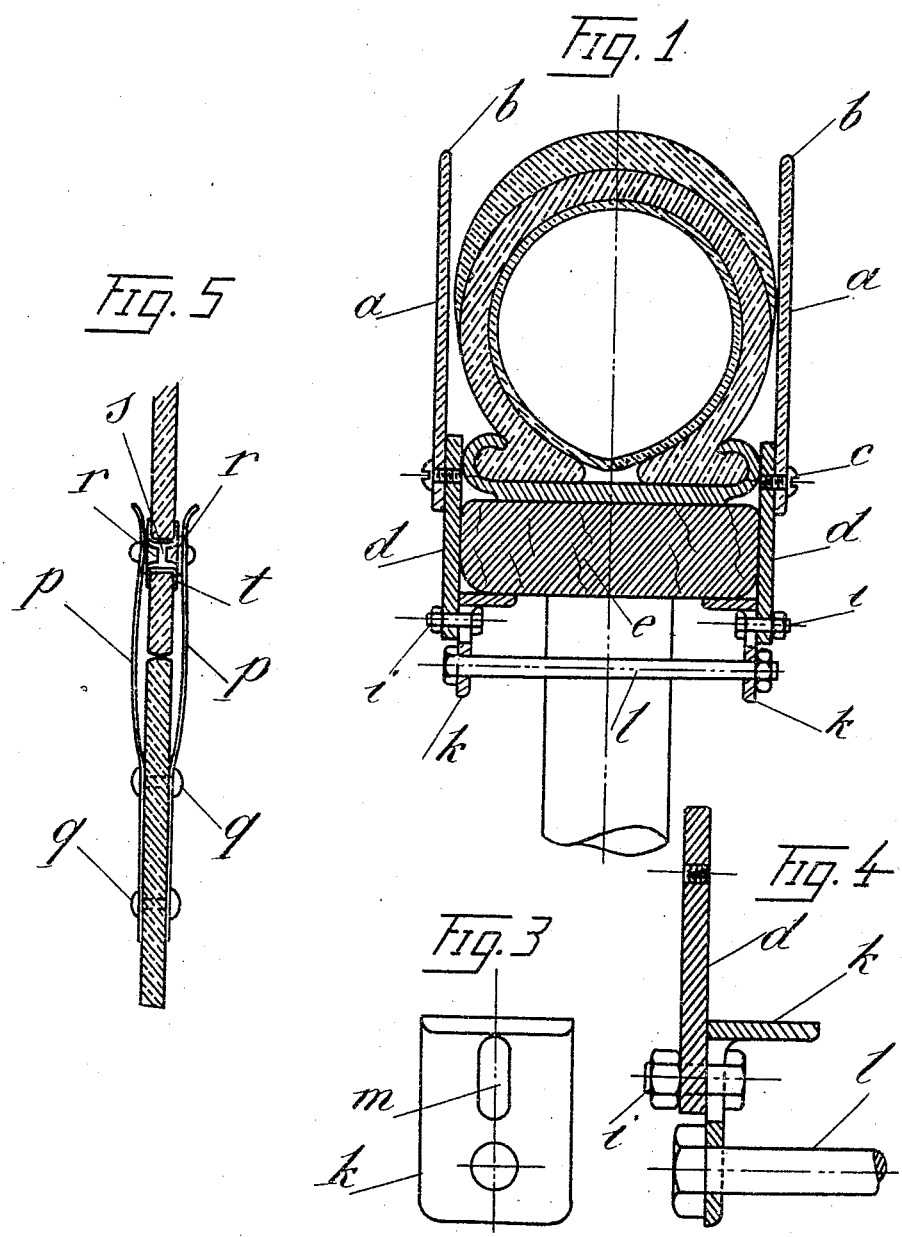
WITNESSES:
John C. Sanders
Albert F. Heuman
INVENTOR:
Edward Danforth Self
BY
ATT'Y

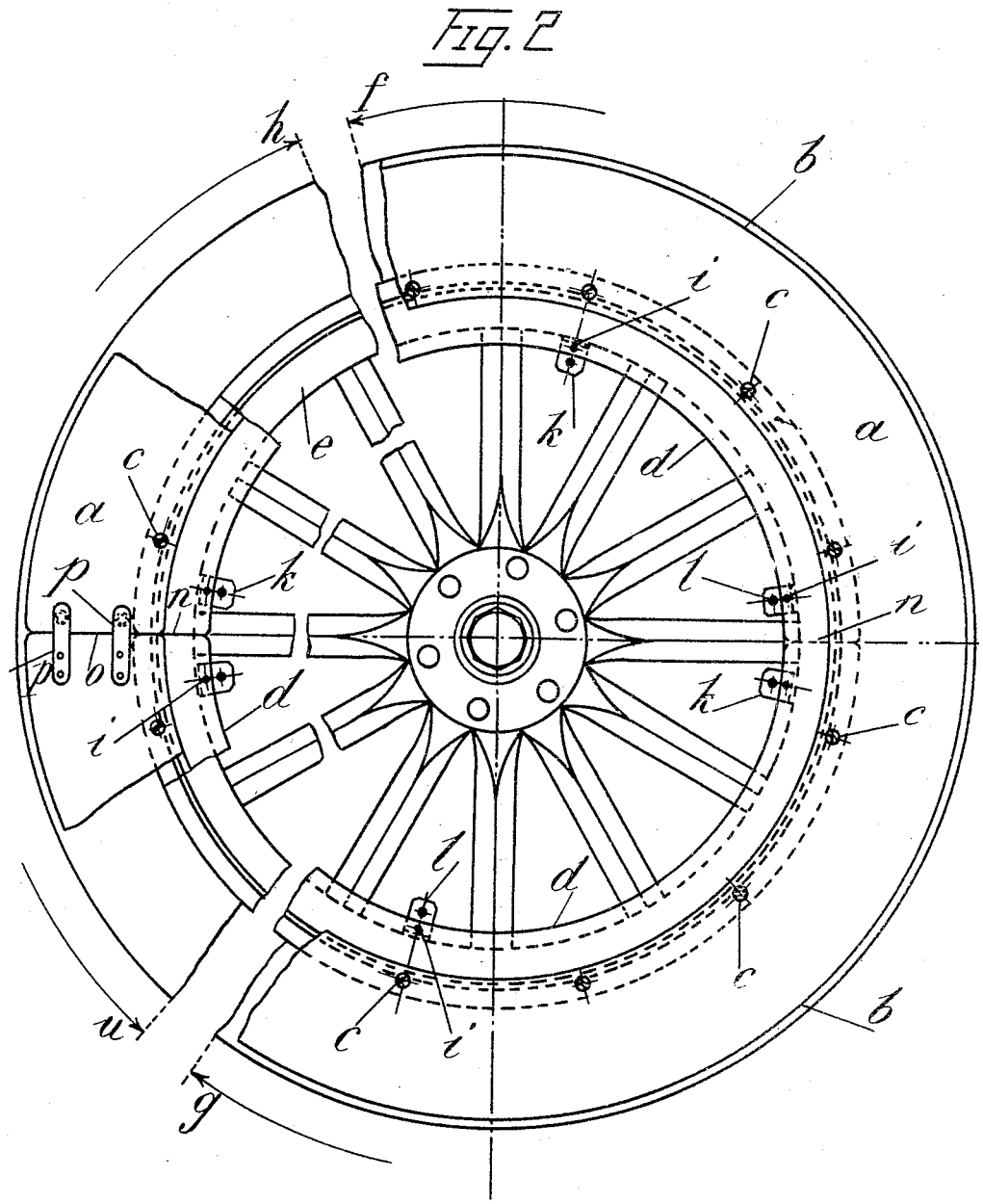

UNITED STATES PATENT OFFICE.

EDWARD DANFORTH SELF, OF FLORENCE, ITALY.

MUD-GUARD FOR AUTOMOBILES OR OTHER VEHICLES.

1,235,251. Specification of Letters Patent. Patented July 31, 1917.

Application filed March 6, 1915. Serial No. 12,691.

*To all whom it may concern:*

Be it known that I, EDWARD DANFORTH SELF, citizen of the United States of America, residing at Florence, Italy, have invented new and useful Improvements in Mud-Guards for Automobiles or other Vehicles, of which the following is a specification.

The characteristic of this new mud-guard consists in the idea of applying to both sides of the wheels of automobiles or other vehicles disks or annular plates of rubber, guttapercha, or other flexible material having the form of circular crowns, which disks are intended to impede the lateral projection of mud along the course of automobile or other vehicle. The outside edges of said circular disks should terminate a little above the level of the street. Said disks can be applied in several ways to the wheels of automobiles or other vehicles.

The method of carrying out the invention is illustrated in the accompanying drawings in which:

Figure 1, represents a transverse section of one of the forms of construction of such disks and the method of applying them to the wheel;

Fig. 2, shows a wheel, the section from F to G being a view of the outside, and H to U of the inside, of the wheel;

Fig. 3, shows a front view of a bracket K;

Fig. 4, shows in sectional view the manner of attaching a bracket K to a disk D; and Fig. 5, shows the means for connecting the parts of the built up inside disk A.

The disks or annular plates $a$ that form the object of the present application and that act as mud-guards, terminate at $b$ a little below the highest point of the tire, so that the mud guard does not come into contact with the ground, and are secured by means of screws $c$ and two circular plates $d$ made of thin metal or any other suitable material attached to the felly $e$ of the wheels. The method of attachment is as shown in Fig. 2: a series of brackets $k$ are secured to the disk $d$ by means of bolts $i$; these brackets simply rest beneath the felly in pairs, one on each side of the wheel, and are held together by tie rods $l$. The bolts $i$, that serve to hold the circular disks $d$ can be moved together with the disks to adapt the apparatus to various forms of the wheels. One of the brackets $k$ is shown separately in a front view and in section in Figs. 3 and 4, respectively. In these figures is shown the slot $m$, which permits the bolt $i$, and consequently the ring $d$, to move, making adjustment possible.

The ring $d$ which serves to support the inside mud-guard must be divided in one or two points to make it possible to mount it without removing the wheel from the axle, and at these points of union there are applied two brackets $k$, as indicated in Fig. 2. Of the two circular disks that constitute the mud-guard the inside one must also be cut at some point, $o$, in order to mount it over the axle. The connection between the two edges of the inside disk $a$, resulting from this cut can be made by applying to the disk at each side of the cut the apparatus indicated separately in Fig. 5. This consists of two springs, $p$, $p$, which are secured to one of the ends of the disk near the cut by means of rivets $g$. The two springs carry small projections $r$, at their other ends which enter the aperture $s$, made in the other end of the disk $a$, which may be conveniently reinforced by a ferrule $t$. This apparatus constructed of said springs and projections holds in place the two ends of the disk. One or more such pairs of springs can be employed to obtain sufficiently secure connection as is indicated in Fig. 2 in which two are shown.

The disk $a$, may also be made of several sections which can be united by the apparatus described.

In case the tires have special dimensions the disks $a$, that constitute the mud guards can be connected with the rings $d$, that serve to hold in place the disks $a$, by means of intermediary connecting pieces.

This type of mud-guard can also be applied by using but one of the disks of rubber, guttapercha or other material. And it can also be applied to the case of solid tires made of rubber or other material. To strengthen the mud-guard the outside edge in contact with the street can be conveniently reinforced by any suitable resisting material.

I claim:

1. A mud-guard for vehicle wheels comprising flexible annular plates of outside diameter slightly less than that of the wheel tread; rigid annular plates having their outside diameter greater than the inside diameter of said flexible annular plates and their inside diameter less than that of the wheel felly; means for attaching said flexible plates to said rigid plates; brackets arranged in pairs bearing on the inner surface of the felly; means for attaching the rigid annular plates to said brackets, and means within the felly for connecting each pair of brackets.

2. A mud-guard for vehicle wheels comprising flexible annular plates adapted to be attached to each side of the wheels, means for detachably clamping said plates to the wheel felly without alteration of the latter, the inner of said annular plates being cut to permit assembly without removal of the wheel from the axle, and springs attached to said inner plates on one side of said cut, recesses in said inner plates on the other side of said cut, and projections upon said springs adapted to engage said recesses.

In testimony whereof I have signed my name to this specification in the presence of two subscribing witnesses.

EDWARD DANFORTH SELF.

Witnesses:
GUG ACLERKE MANNUCCI,
WILLIAM W. BURT.

Copies of this patent may be obtained for five cents each, by addressing the "Commissioner of Patents, Washington, D. C."